(12) United States Patent
Hall et al.

(10) Patent No.: US 6,261,716 B1
(45) Date of Patent: *Jul. 17, 2001

(54) BATTERY CELL SLEEVE FOR SPACECRAFT APPLICATIONS

(75) Inventors: John C. Hall, Rancho Palos Verdes; Mitchell J. Mehlman; Terry Weight, both of Pleasanton; Erik L Levine, San Jose, all of CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/189,047

(22) Filed: Oct. 22, 1998

Related U.S. Application Data

(63) Continuation-in-part of application No. 09/018,510, filed on Feb. 4, 1998.

(51) Int. Cl.[7] .................................................. H01M 2/02
(52) U.S. Cl. .............................. 429/163; 429/99; 429/163
(58) Field of Search ............................... 429/99, 164, 163

(56) References Cited

U.S. PATENT DOCUMENTS

| | | | |
|---|---|---|---|
| 5,510,208 | * 4/1996 | Hall et al. | 429/164 |
| 5,786,107 | 7/1998 | Stafford et al. | 429/163 |

* cited by examiner

Primary Examiner—Carol Chaney
Assistant Examiner—Mark Ruthkosky
(74) Attorney, Agent, or Firm—Perman & Green, LLP

(57) ABSTRACT

According to the present invention, a battery cell sleeve assembly includes a continuous tubular sleeve extending between proximal and distal ends and has a plurality of substantially unidirectional longitudinally extending elongated heat conduction fibers having a thermal conductivity no less than that of aluminum embedded in a suitable matrix. The sleeve is received on the outer peripheral surface of a tubular battery cell which is typically, but not necessarily cylindrical and in a contiguous relationship with the battery cell. A tubular base member having a peripheral flange is attached to the continuous tubular sleeve such that the distal ends of the heat conduction fibers are contiguous with the peripheral flange. With this construction, the peripheral flange operates as a heat shunt for drawing heat away from the continuous tubular sleeve by conduction between the heat conduction fibers and the peripheral flange. In one embodiment, the heat conduction fibers are graphite and the continuous tubular sleeve is between about 0.010 and 0.25 inches thick and composed of about 60% fiber and 40% adhesive by volume. An electrically insulative adhesive such as an epoxy with a defined bond line of about 0.005 inches is applied to the interface between the continuous tubular sleeve and the tubular base member. After integrating the battery cell and the continuous tubular sleeve, the battery cell is charged. This causes the battery cell to become pressurized which, in turn, enlarges its outer periphery such that it becomes more firmly engaged with the continuous tubular sleeve.

19 Claims, 2 Drawing Sheets

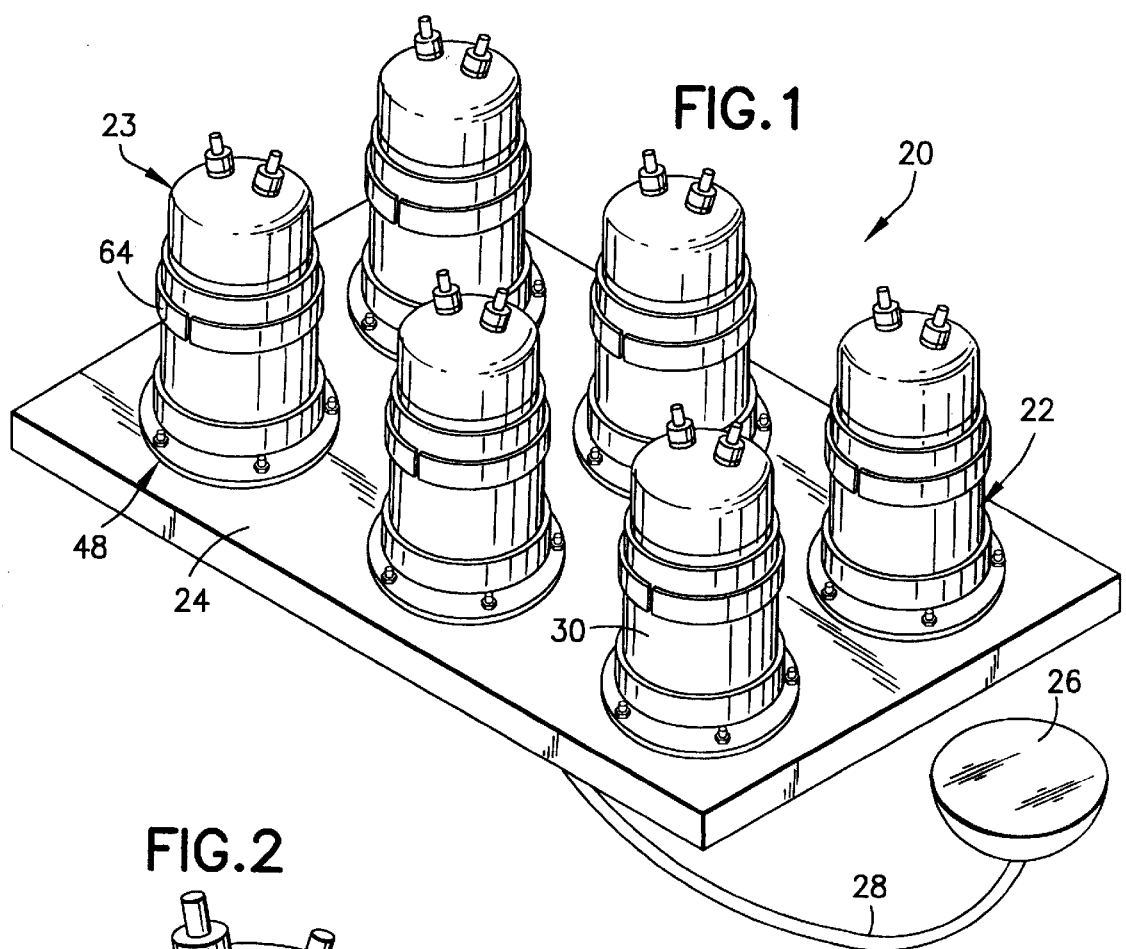
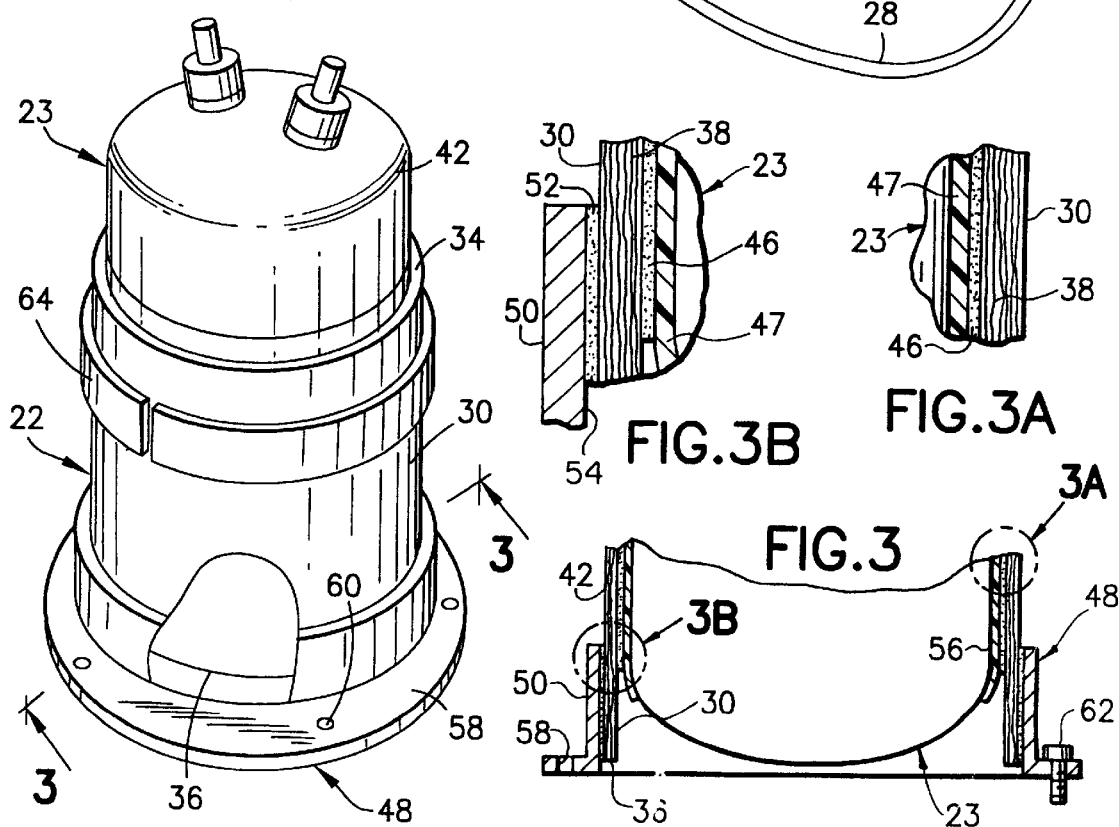

BATTERY CELL SLEEVE FOR SPACECRAFT APPLICATIONS

This Application is a continuation-in-part of Ser. No. 09/018,510 filed Feb. 4, 1998.

BACKGROUND OF THE INVENTION

1. Field of the Invention

The present invention relates generally to improved systems for mounting batteries on spacecraft to assure their integrity, operability, and long life. Throughout this disclosure, the term "spacecraft" will be used in the generic sense to refer to spacecraft of all types whether they be launch vehicles, space stations, satellites, space probes, or other vehicles operable in a space environment.

2. Description of the Prior Art

Nickel hydrogen and other varieties of chemical batteries for spacecraft are typically mounted into the structure of the spacecraft by means of a plurality of cylindrical metallic sleeves which supportively receive individual cells. The functions of the sleeves are to (a) physically connect each cell to the battery structure and (b) conduct waste heat due to the operation of the cell to the base plate of the battery and thence to the spacecraft heat rejection system (e.g., an optical space radiator).

Numerous metals have been proposed and used for the fabrication of the battery cell sleeves. These have included aluminum, beryllium, magnesium and alloys of these metals. In actual fact, aluminum is the metal most commonly employed for this purpose. All of these materials meet the technical requirements of having high thermal conductivity, adequate ultimate strength, generally good fracture resistance, and low density. As is common in all space-related activities, weight is a serious consideration in the design and construction of battery cell sleeves such that materials other than metals are continuously being sought which possess all the characteristics noted above while being significantly lighter in weight.

In recent years, composite materials have more and more become materials of choice to replace metals in applications requiring strength and light weight. Composite materials, or "composites", incorporate dusters of elongated fibers of strong materials embedded in a slurry-like amorphous matrix which subsequently solidifies and binds the fibers together into a strong unit. This matrix may be polycyanate, blends of epoxy and polycyanate, or other suitable materials which have high binding strength, are light in weight, and do not have adverse characteristics, for example, flaking off into free-floating particles in space.

Graphite is one example of a material which has outstanding thermal conductivity, especially in the pyrrolic form, and low density (~2 g/cm2). In actual fact, any strong, ultra-high thermal conductivity fibers may be employed for this purpose. Pure graphite, however, is extremely brittle and for this reason, its use as a sleeve material has not previously been seriously considered. An additional non-technical but significant economic impediment to the use of graphite is that it can only be fabricated into formed parts from solid monoblocks by expensive machining.

A number of examples will now be presented which are representative of the prior art generally relating to this area of technology.

U.S. Pat. No. 5,310,141 issued May 10, 1994 to Homer et al. discloses cylindrical battery cells coupled together in plural sets by pairs of half-shell sleeves. The sleeves conduct heat preferentially in an axial direction. Each sleeve set is mounted onto a heat rejection plate for direct radiation to space.

U.S. Pat. No. 5,096,788 issued Mar. 17, 1992 to Bresin et al. discloses a battery pack having a housing and a plurality of cells within the housing, each cell having a positive and negative terminal, and a flex circuit interconnecting the plurality of cells with a biasing appliance providing appropriate contact between the flex circuit and the cell terminals.

U.S. Pat. No. 4,828,022 issued May 9, 1989 to Koehler et al. discloses a heat conducting sleeve designed to fit around a cylindrical heat source such as a battery for use in a satellite. The design is chosen to obtain the optimum tradeoff between heat transfer capability of the sleeve and its weight for a given application.

U.S. Pat. No. 4,420,545 issued Dec. 13, 1983 to Meyer et al. discloses a pressurized metal-gas battery with emphasis upon reducing weight and volume. End plates axially compress the electrode stack and support it radially within the pressure vessel. This reduces stack stress during vibration and cell cycling. The stack is not bonded to the pressure vessel at any point in the battery but is a free unit confined only by the vessel boundary.

U.S. Pat. No. 4,346,151 issued Aug. 24, 1982 to Uba et al. discloses a multicell sealed rechargeable battery including an open mouth monobloc container formed of a plurality of cup-shaped cell holders interconnected at mutual tangent zones, electrochemical cells of the rechargeable type fitting into the cell holders and interconnected to form the battery, and a closure member attached to the mouth of the monobloc container.

The concept of using thermally conductive graphite fibers as a light weight material for a nickel hydrogen cell sleeve is the subject of U.S. Pat. No. 5,510,208 issued Apr. 23, 1996 to Hall et al. In this prior invention, a cylinder of axially oriented graphite epoxy fiber is reinforced on the inner and outer surfaces with square weave structural graphite epoxy laminate and replaces a conventional aluminum part. To provide interface compatibility with the aluminum part, the graphite epoxy part has adhesively attached to it features to clamp the cylinder to the cell and to structurally integrate the cell sleeve assembly so formed with other cell sleeve assemblies. The cylinder is partially slotted in the axial direction to form a key way which provides movement for radial compression.

It was in light of the state of the technology as just discussed that the present invention was conceived and has now been reduced to practice.

SUMMARY OF THE INVENTION

According to the present invention, a battery cell sleeve assembly includes a continuous tubular sleeve extending between proximal and distal ends and has a plurality of substantially unidirectional longitudinally extending elongated heat conduction fibers having a thermal conductivity no less than that of aluminum embedded in a suitable matrix. The sleeve is received on the outer peripheral surface of a tubular battery cell which is typically, but not necessarily cylindrical and in a contiguous relationship with the battery cell. A tubular base member having a peripheral flange is attached to the continuous tubular sleeve such that the distal ends of the heat conduction fibers are contiguous with the peripheral flange. With this construction, the peripheral flange operates as a heat shunt for drawing heat away from the continuous tubular sleeve by conduction between the heat conduction fibers and the peripheral flange. In one embodiment, the heat conduction fibers are graphite and the continuous tubular sleeve is between about 0.010 and 0.25 inches thick and composed of about 60% fiber and 40% adhesive by volume. An electrically insulative adhesive such as an epoxy, filled epoxy, polycyanate, filled polycyanate with a controlled nominal 5 mil bond line, or thickness, is applied to the interface between the continuous tubular sleeve and the tubular base member. After integrating the battery cell and the continuous tubular sleeve, the battery cell is charged. This causes the battery cell to become pressurized which, in turn, enlarges its outer periphery such that it becomes more firmly engaged with the continuous tubular sleeve.

Thus, the present invention reiterates the teachings of Patent No. 5,510,208 as to the use of high thermal conductivity, low density graphite fibers as one desirable material for the construction cell sleeves. Graphite fibers have favorable thermal conductivities up to 1100 W/m° K as compared with pyrrolitic graphite (k>2000 W/m° K) and pure aluminum (k=230 W/m° K). In addition, and of even greater importance, unidirectional fiber always can be embedded in a suitable matrix (epoxy, polycyanate, epoxy-cyanate blends) into thin conformal sheets. Such sheets can, for example, be easily formed into a tube suitable for use as a cell sleeve.

In the present invention, however, the following improvements are taught on the composite sleeve construction disclosed in U.S. Pat. No. 5,510,208. In a first instance, rather than attach the slotted tubular sleeve to the cell with mechanical fasteners whose mounting points are bonded to the sleeve, a continuous (unslotted) sleeve is bonded to the uncharged cell with adhesive. The clamping action between the cell and cylinder is achieved additionally by charging the cell which in turn pressurizes the cell and causes its lateral dimensions to grow against the inner surface of the tubular sleeve. This design modification reduces cost and weight.

Further, because the tubular sleeve no longer needs to be slotted, the inner layer of square weave structural graphite epoxy laminate of the earlier embodiment may be eliminated. This inner layer was required to prevent buckling with slotted cylinders. However, this component is not required for an unslotted tubular sleeve and, additionally, its other structural functions are met by the cell which is now structurally bonded to the inner peripheral surface of the sleeve. This feature reduces cost and weight and slightly improves the thermal performance of the cell sleeve as the inner structural layer of the prior art creates a thermal impedance between the cell source of heat and the social graphite heat removal path.

Additionally, at the juncture between the tubular sleeve and the lower mounting bracket, the adhesive joint is modified by the use of a filled electrically insulative epoxy or other suitable adhesive material with a controlled bond line on the order of 0.005 inch. The effect of this construction is to electrically insulate the cell sleeve from the spacecraft. In the prior art, this function has been provided by the use of a layer of electrically insulative rubber or plastic film between the cell and the inner peripheral surface of the cylinder. With this new approach, the layer of rubber or plastic film can be deleted, thereby saving weight.

Such unidirectional graphite fiber arrays so laminated with a suitable matrix meet the thermal requirements of a cell sleeve assembly for a spacecraft in that they will operate to conduct heat from the electrochemical cell to the spacecraft radiator.

Indeed, the unidirectional thermal layers provide the required conductive properties which heretofore were provided by an isotropic metallic sleeve.

In practice, structures of the invention have been fabricated with AMOCO brand K1100 graphite fiber. The graphite fibers are oriented either at 0° or at +/−15° with respect to the longitudinal axis of the cell. Such layers are typically 0.005" thick and composed of 60% fiber and 40% resin by volume. The required thermal conductivity is obtained by using sufficient layers factored for their off-axis angle.

The need to interface the cell sleeve mechanically and thermally with other cells in the battery and with the spacecraft has been addressed by suitably bonding machined aluminum parts to the heterogeneous fiber-matrix structure described above as required to complete the thermal and mechanical interfaces to the spacecraft. Thus, at the base of the fiber-matrix sleeve is an overlap bond with a concentric aluminum cylinder which serves as the mechanical and thermal interface to the battery base plate. The overlap is along an axial length of approximately 1" with a bond thickness of between about 0.001" and 0.005". This design assures a sound mechanical interface and a low heat flux across the low thermal conductivity bond joint.

Also, aluminum mechanical features may be bonded to the outer peripheral surface of the continuous sleeve for mechanically joining the cell to adjacent cells for improved mechanical competence.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention and, together with the description, serve to explain the principles of the invention in general terms. Like numbers refer to like parts throughout the disclosure.

BRIEF DESCRIPTION OF THE DRAWINGS

FIG. 1 is a perspective view diagrammatically illustrating for a spacecraft a battery system embodying the present invention;

FIG. 2 is a perspective view of a single battery cell sleeve assembly embodying the present invention and utilized in the battery system illustrated in FIG. 1;

FIG. 3 is a cross section view, taken generally along line 3—3 in FIG. 2, depicting, in greater detail, a part of the battery cell sleeve assembly illustrated in FIG. 2;

FIG. 3A is a detail cross section view illustrating in greater detail a portion of FIG. 3;

FIG. 3B is a detail cross section view illustrating in greater detail another portion of FIG. 3.

DETAILED DESCRIPTION OF THE PREFERRED EMBODIMENT

Figure 4:
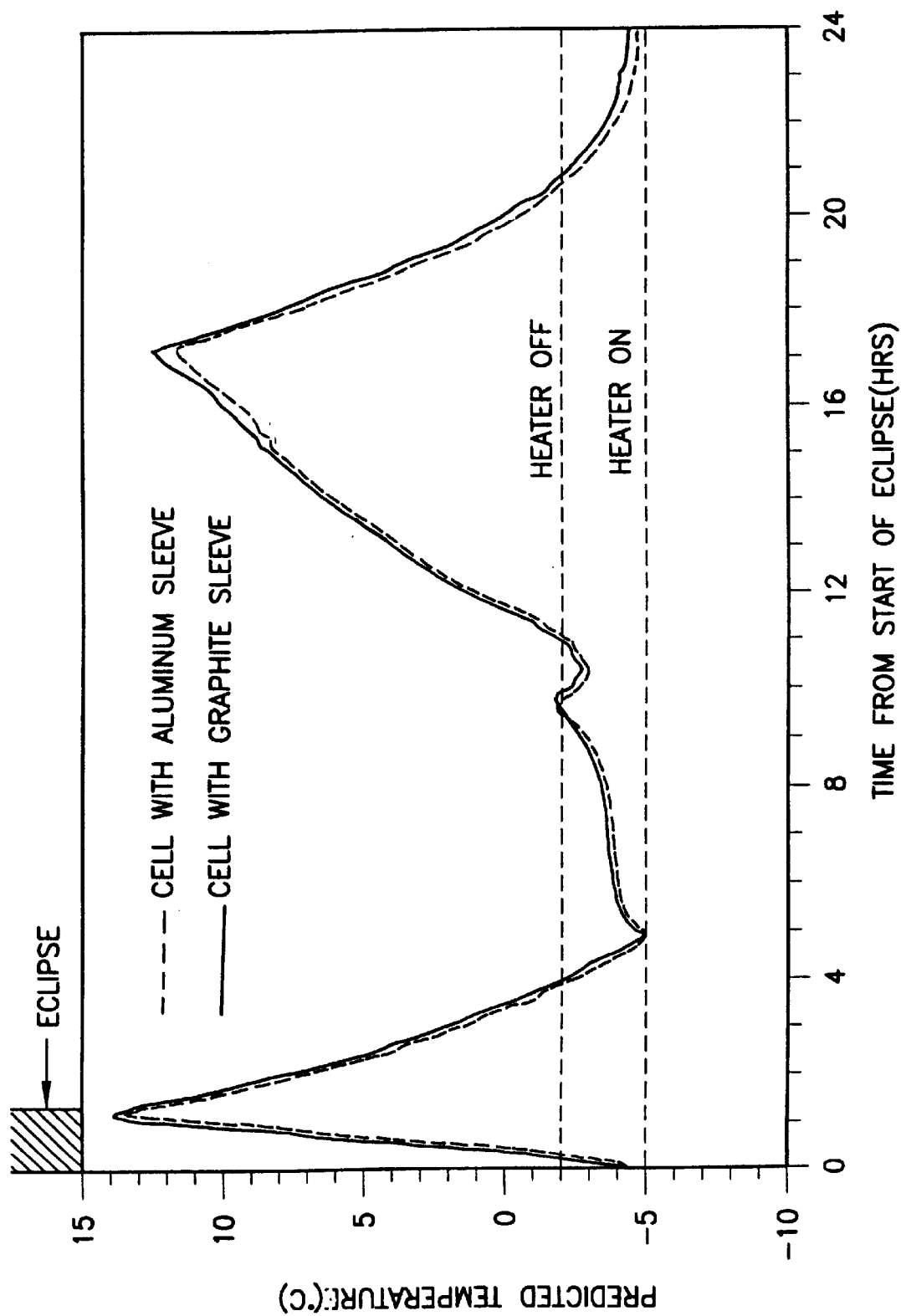
FIG. 4 is a graph comparing the performance of the graphite/epoxy construction of the battery cell sleeve assembly of the invention with the prior art aluminum construction.

Turn now to the drawings and, initially, to FIG. 1 which diagrammatically illustrates a battery system 20 for use in a spacecraft and embodying the concepts of the present invention. A plurality of battery cell sleeve assemblies 22 are mounted in a manner to be described to a base plate 24 which may be of aluminum honeycomb, for example. The base plate 24 serves as a gross heat shunt for drawing heat away from each of the sleeve assemblies 22. In turn, heat is withdrawn from the base plate 24 and delivered to a suitable optical space radiator 26 via a suitable heat transfer member 28, also diagrammatically shown. The optical space radiator is positioned on the side opposite the honeycomb panel of the base plate and faces deep space, that is, a low temperature sink.

The design features of the battery cell sleeve assemblies 22 which embody the invention are more clearly demonstrated in FIGS. 2, 3, and 3A. FIG. 2 depicts continuous tubular fiber-matrix sleeve assembly 22 according to the invention intended for a 3.5" diameter battery cell 23, typically cylindrical with opposed domed ends. It serves to replace an aluminum (prior art) sleeve intended for the same battery cell. The fiber-matrix sleeve assembly of the invention may weigh about 165 g, for example, whereas the aluminum prior art sleeve assembly weighs about 325 g. As shown in FIG. 4, the two sleeve assemblies demonstrate equivalent thermal performance. In this regard, each battery cell assembly 22 may be provided with a suitable heater 64 mounted on and overlying the outer peripheral surface of the thermal sleeve 30.

The actual construction of the sleeve assembly 22 will now be described with particular reference to FIGS. 2, 3, and 3A. The thermal sleeve 30 extends between proximal and distal ends 34, 36 of the sleeve assembly 22 and has a plurality of first substantially unidirectional longitudinally extending elongated fibers 38 of high conductivity, low density, material embedded in a matrix 40 which may be polycyanate, blends of epoxy and polycyanate, or other suitable binding material. Aluminum is the desirable yardstick for the physical characteristics of the sleeve assembly. That is, the fibers 38 are chosen such that the sleeve assembly 22 will have a thermal conductivity equal to a sleeve fabricated of aluminum and a weight substantially less than one of aluminum. The fibers are preferably graphite, a commercially available example of the fibers being AMOCO brand K1100 with the graphite fibers oriented either at 0° or at +/−15° with respect to the longitudinal axis of the cell. Such layers are typically 0.005" thick and composed of 60% fiber and 40% epoxy by volume. The required thermal conductivity may be obtained by using sufficient layers factored for their off axis angle. Any other commercially available ultra high thermal conductivity fiber (K>800 W m/° C.) could also be used. The thermal sleeve 30 is between about 0.010 and 0.25 inches thick and is received in a contiguous relationship on the outer peripheral surface 42 of the battery cell 23. Adhesive 46 (FIG. 3A) or other suitable bonding medium is interposed between the thermal sleeve 30 and the outer surface 42 for fixedly joining those components in the relationship illustrated in FIG. 2. It may be desirable for some applications that a layer 47 of suitable insulation in the form of a heat shrinkable film overlie the outer peripheral surface 42 of the battery cell 23. In this instance, as illustrated in FIG. 3A, it would be required that the adhesive 46 actually overlie the insulative layer 47.

Turning now to FIGS. 2, 3, and 3B, a tubular base member 48, still likely of aluminum, has an upstanding flange 50 for reception thereto of the distal end 36 of the thermal sleeve 30. As seen in FIG. 3B, a suitable adhesive 52 is employed to bond the outer surface of the thermal sleeve 30 to the inner peripheral surface 54 of the upstanding flange 50 of the base member 48. The adhesive 52 preferably includes a filled electrically insulative epoxy or other suitable adhesive material with a defined bond line which is no less than about 0.005 inch. In this manner, the thermal sleeve 30 is assured of being electrically insulated from the spacecraft. The lower outside surface of the thermal sleeve 30 is contiguous with the inner peripheral surface 54 of the upstanding flange 50 of the base member 48. With this construction, the thermal fibers 38 are contiguous with the upstanding flange 50 such that the upstanding flange operates as a heat shunt for drawing heat away from the thermal sleeve by conduction between the fibers 38 and the upstanding flange.

Considered as a unit, and viewing especially FIG. 3, the sleeve assembly 22 defines a recess 56 for reception therein of the battery cell 23.

The base member 48 also includes an outer peripheral flange 58 FIG. 3) which is suitably pierced, as at 60, at a plurality of equally spaced circumferential locations to receive threaded fasteners 58 to mount it securely on the base plate 24. It is within the scope of the invention for the peripheral flange 58 to be inwardly directed, being provided for stability, with a plurality of circumferentially spaced outwardly directed feet being provided for mounting to the base plate.

The fiber-matrix/aluminum base sleeve assembly 22 has the further advantage over the prior art all-aluminum sleeves in that it is intrinsically double insulated since the aluminum is hard anodized and the surface of the thermal sleeve 30 is pure adhesive. This affords additional electrical fault protection.

While a preferred embodiment of the invention has been disclosed in detail it should be understood by those skilled in the art that various other modifications may be made to the illustrated embodiments without departing from the scope of the invention as described in the specification and defined in the appended claims.

What is claimed is:

1. A battery cell sleeve assembly comprising:
    a continuous thermal sleeve extending between proximal and distal ends and having a longitudinal axis comprised of a plurality of substantially unidirectional longitudinally extending elongated heat conduction fibers being embedded in a matrix, said thermal sleeve being received on the outer peripheral surface of a battery cell in a contiguous relationship thereto; and
    a base member having a flange for reception thereon of said distal end of said thermal sleeve, said distal end of said thermal sleeve being contiguous with said flange whereby said flange operates as a heat shunt for drawing heat away from said thermal sleeve by conduction between said heat conduction fibers and said flange.

2. A battery cell sleeve assembly as set forth in claim 1 wherein said heat conduction fibers have a thermal conductivity no less than that of aluminum.

3. A battery cell sleeve assembly as set forth in claim 1 wherein said heat conduction fibers are graphite; and wherein said thermal sleeve is between about 0.010 and 0.25 inches thick and composed of about 60% fiber and 40% matrix by volume.

4. A battery cell sleeve assembly as set forth in claim 1 including:
    bonding means for fixedy joining said thermal sleeve to the outer peripheral surface of the battery member.

5. A battery cell sleeve assembly as set forth in claim 1 including:
    bonding means for fixedly joining said thermal sleeve to said base member.

6. A battery cell sleeve assembly as set forth in claim 5 wherein said bonding means includes a filled electrically insulative adhesive with a defined bond line no less than about 0.005 inch.

7. A battery cell sleeve assembly comprising:
a continuous thermal sleeve extending between proximal and distal ends and having a longitudinal axis comprised of a plurality of substantially unidirectional longitudinally extending elongated heat conduction fibers of material having a heat conductivity generally equal to that of aluminum and a density generally less than that of aluminum, said heat conduction fibers being embedded in a matrix; and
a base member having a annular flange for reception thereon of said distal end of said thermal sleeve, said distal end of said thermal sleeve being contiguous with said flange whereby said flange operates as a heat shunt for drawing heat away from said thermal sleeve by conduction between said heat conduction fibers and said flange.

8. A battery cell sleeve assembly comprising:
a continuous thermal sleeve extending between proximal and distal ends and having a longitudinal axis and comprised of a plurality of substantially unidirectional longitudinally extending elongated heat conduction fibers being embedded in a matrix; and
a base member having an upstanding annular flange for reception thereon of said distal end of said thermal sleeve, said distal end of said thermal sleeve being contiguous with said flange whereby said flange operates as a heat shunt for drawing heat away from said thermal sleeve by conduction between said heat conduction fibers and said flange.

9. A method of producing a battery cell structure comprising the steps of:
(a) providing a continuous thermal sleeve extending between proximal and distal ends and having a longitudinal axis comprised of a plurality of substantially unidirectional longitudinally extending elongated heat conduction fibers being embedded in an adhesive matrix;
(b) attaching the thermal sleeve onto the outer peripheral surface of a cylindrical battery cell in a contiguous relationship thereto; and
(c) attaching a base member including a flange onto the thermal sleeve for reception thereon of the distal ends of the thermal sleeve being contiguous with the flange whereby the flange operates as a heat shunt for drawing heat away from the thermal sleeve by conduction between the heat conduction fibers and the flange.

10. A method as set forth in claim 9 including the step of:
(d) applying to the interface between the thermal sleeve and the cylindrical base member an electrically insulative adhesive.

11. A method as set forth in claim 10 wherein the adhesive applied in step (d) is an epoxy with a defined bond line of no less than about 0.005 inches.

12. A method as set forth in claim 9 including the step of
(d) charging the battery cell thereby pressurizing the battery cell and enlarging its outer circumference such that it thereby becomes more firmly engaged with the thermal sleeve.

13. A battery system comprising:
a plurality of battery cell sleeve assemblies mounted on a base plate, said base plate being a gross heat shunt for drawing heat away from each of said battery cell sleeve assemblies; and
a space radiator thermally connected to said base plate for radiating heat away therefrom;
wherein each of said battery cell sleeve assemblies includes:
a continuous thermal sleeve extending between proximal and distal ends and having a longitudinal axis comprised of a plurality of substantially unidirectional longitudinally extending elongated heat conduction fibers being embedded in a matrix, said thermal sleeve being received on the outer peripheral surface of a battery cell in a contiguous relationship thereto;
a base member having a flange for reception thereon of said distal end of said thermal sleeve, said distal end of said thermal sleeve being contiguous with said flange whereby said flange operates as a heat shunt for drawing heat away from said thermal sleeve by conduction between said heat conduction fibers and said flange.

14. A battery cell sleeve assembly as set forth in claim 1 wherein said base member includes a base peripheral flange for mounting to a base plate and an integral upstanding tubular flange to which said thermal sleeve is bonded.

15. A battery cell sleeve assembly as set forth in claim 7 wherein said base member includes a base peripheral flange for mounting to a base plate and an integral upstanding tubular flange to which said thermal sleeve is bonded.

16. A battery cell sleeve assembly as set forth in claim 8 wherein said base member includes a base peripheral flange for mounting to a base plate and an integral upstanding tubular flange to which said thermal sleeve is bonded.

17. A battery cell sleeve assembly as set forth in claim 13 wherein said base member includes a base peripheral flange for mounting to a base plate and an integral upstanding tubular flange to which said thermal sleeve is bonded.

18. A battery cell sleeve assembly for a spacecraft comprising:
a continuous thermal sleeve extending between proximal and distal ends and having a longitudinal axis comprised of a plurality of substantially unidirectional longitudinally extending elongated heat conduction fibers being embedded in a matrix, said thermal sleeve being received on the outer peripheral surface of a battery cell in a contiguous relationship thereto; and
a base member integral with said distal end of said thermal sleeve including a base peripheral flange mounting said thermal sleeve on a base plate connected to a space radiator for radiating heat away therefrom whereby said base peripheral flange operates as a heat shunt for drawing heat away from said thermal sleeve by conduction between said heat conduction fibers and said base peripheral flange.

19. A battery cell sleeve assembly as set forth in claim 18 wherein said heat conduction fibers have a thermal conductivity no less than that of aluminum.

* * * * *